United States Patent [19]

Von Nikelsberg et al.

[11] 3,764,925

[45] Oct. 9, 1973

[54] DEMODULATOR CIRCUIT

[75] Inventors: Karl Frans Nickl Von Nikelsberg; Gerrit Kool, both of Emmasingel, Eindhoven, Netherlands

[73] Assignee: U.S. Philips Corporation, New York, N.Y.

[22] Filed: Jan. 26, 1972

[21] Appl. No.: 221,001

[30] Foreign Application Priority Data

Feb. 17, 1971 Netherlands ...................... 7102078

[52] U.S. Cl. .......... 329/50, 178/5.4 SD, 307/235 R, 328/134, 329/166, 330/30 D

[51] Int. Cl. .............................................. H03d 3/18

[58] Field of Search .............................. 329/50, 166; 332/43 B; 330/30 D, 69; 178/5.4 SD; 328/134; 307/233, 235 R

[56] References Cited

UNITED STATES PATENTS

| | | | |
|---|---|---|---|
| 2,429,636 | 10/1947 | McCoy | 328/134 |
| 3,483,488 | 12/1969 | Crosby | 328/134 X |
| 3,514,720 | 5/1970 | Roucache et al. | 329/50 X |
| 3,239,768 | 3/1966 | Sikorra | 329/50 |
| 3,241,078 | 3/1966 | Jones | 329/50 |

*Primary Examiner*—Alfred L. Brody
*Attorney*—Frank R. Trifari

[57] ABSTRACT

A synchronous demodulator circuit for a television receiver in which interference signals corresponding to troublesome white are obviated by full-wave rectification of the signal demodulated by the circuit arrangement.

4 Claims, 2 Drawing Figures

DEMODULATOR CIRCUIT

The invention relates to a demodulator circuit for demodulating a television signal modulated carrier, comprising a first input for the signal to be demodulated, a second input for a reference signal which is coupled in frequency and phase with the signal to be demodulated, an output circuit and an output for a demodulated television signal.

A demodulator circuit of the kind described above is known from "Proceedings of the National Electronics Conference," Vol. XXV, Chicago, 1969, p.806, in which circuit the reference signal is obtained from the unmodulated Y-signal with the aid of a filter. This demodulator circuit has an output circuit which includes a load resistor in a part of the demodulator circuit, which load resistor is coupled to the output through an amplification and emitter follower circuit.

Demodulator circuits of such a type in which a reference signal obtained in one way or other is used for the demodulation of the television signal have the drawback that interferences at a level beyond the 100 % modulation level, hence interferences corresponding to an overmodulated signal may occur in their output signal.

The object of the present invention is to obviate this drawback.

According to the invention the demodulator circuit of the kind described in the preamble is characterized in that the output circuit is a balanced output circuit and is coupled to the output at least through a full-wave rectifier circuit.

By using a balanced output circuit two demodulated signals having a location in reverse to a level corresponding to the maximum modulation depth are obtained from which only the parts which are on the same side of this level are selected with the aid of the full-wave rectifier circuit. The desired signal from one half of the demodulator circuit is then applied to the output and a demodulated overmodulated interference signal having a reverse location is applied from the other half.

Due to this step such interferences which would cause the screen of a display tube to luminesce brightly to a troublesome extent upon display are converted into interferences having the opposite direction and being much less troublesome upon display.

In order that the invention may be readily carried into effect, some embodiments thereof will now be described in detail by way of example with reference to the accompanying diagrammatic drawing in which.

Figure 1:
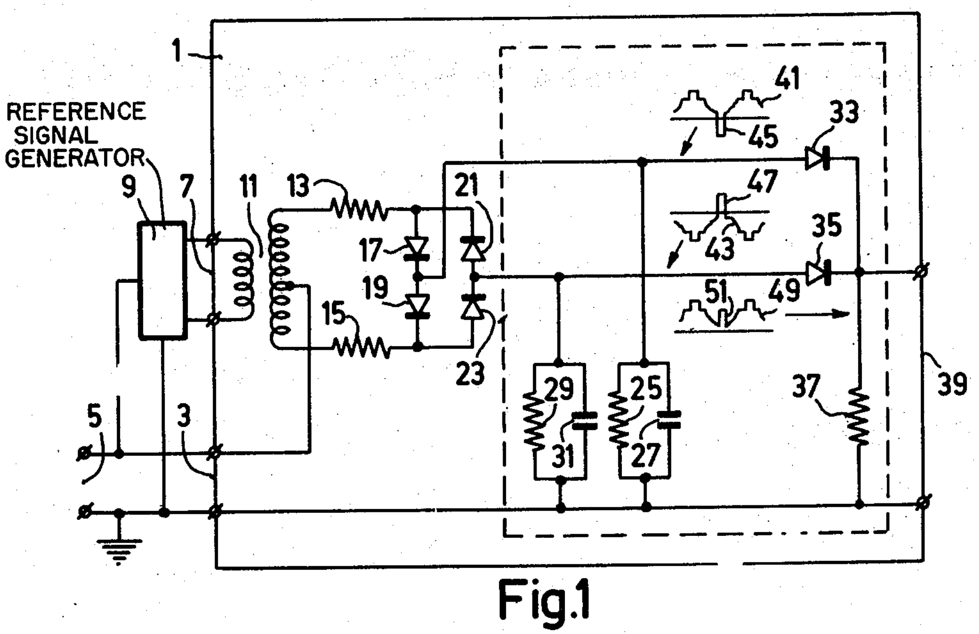
FIG. 1 shows a demodulator circuit according to the invention employing diodes in a non-detailed principle circuit diagram.

In FIG. 1 a demodulator circuit 1 has a first input 3 which is connected to an input 5 for a modulated television signal and a second input 7 which is coupled to the input 5 through a reference signal generator 9.

In its simplest form the reference signal generator 9 may be substantially an interconnection for alternating voltage but generally it will include a filter circuit optionally combined with limiters and/or amplifiers or an oscillator which is controlled in frequency and phase with the aid of the signal applied to the input 5.

A reference signal obtained from the reference signal generator 9 is applied through the second input 7 to a primary winding of a transformer 11. Furthermore the transformer 11 has a secondary winding a central tap of which is connected to the first input 3. The ends of the secondary winding are connected through resistors 13 and 15 to the ends of two parallel-arranged opposite series arrangements of diodes 17, 19 and 21, 23.

The junctions of the diodes 17 and 19 and of the diodes 21 and 23 are connected to a balanced output circuit which is constituted by a first RC network 25, 27 and a second RC network 29, 31, respectively, and furthermore through a full-wave rectifier circuit which includes diodes 33 and 35 and a resistor 37 whose other end is connected to earth and to an output 39.

The operation of the circuit arrangement in so far as it is important for the understanding of the invention will now be further described.

As a result of the reference signal applied to the second input 7 and transmitted to the secondary winding of the transformer 11, for example, the diodes 17, 19 will conduct during the positive half period of this signal and the diodes 21 and 23 will conduct during the negative half period.

The positive half periods of the signal to be demodulated and applied to the input 3 will now be applied to the first RC network 25, 27 and the negative half periods will be applied to the second RC network 29, 31 so that voltages are produced across these networks as are indicated by the wave-forms 41 and 43, respectively, shown in the Figure.

As is known these waveforms, unlike waveforms obtained by peak detection, may have so-called whiter-than-white interference signals which have a level corresponding to more than 100 % modulation depth. Upon display this would result in a very bright luminescence of the screen of a display tube. In the drawing the signals are denoted by 45 and 47 in the waveforms 41 and 43, respectively.

As a result of the full-wave rectifier circuit only the positive portions of each waveform 41 and 43 are passed so that a signal having a waveform denoted by 49 in the Figure is produced at the output 39 in which the interference corresponding to a more than 100 % modulation level is inverted and converted into an interference 51 of the opposite direction.

It will be evident that, if desired, the polarity of the output signal can be changed by inverting the diodes 33 and 35 while maintaining the properties of the circuit arrangement.

Figure 2:
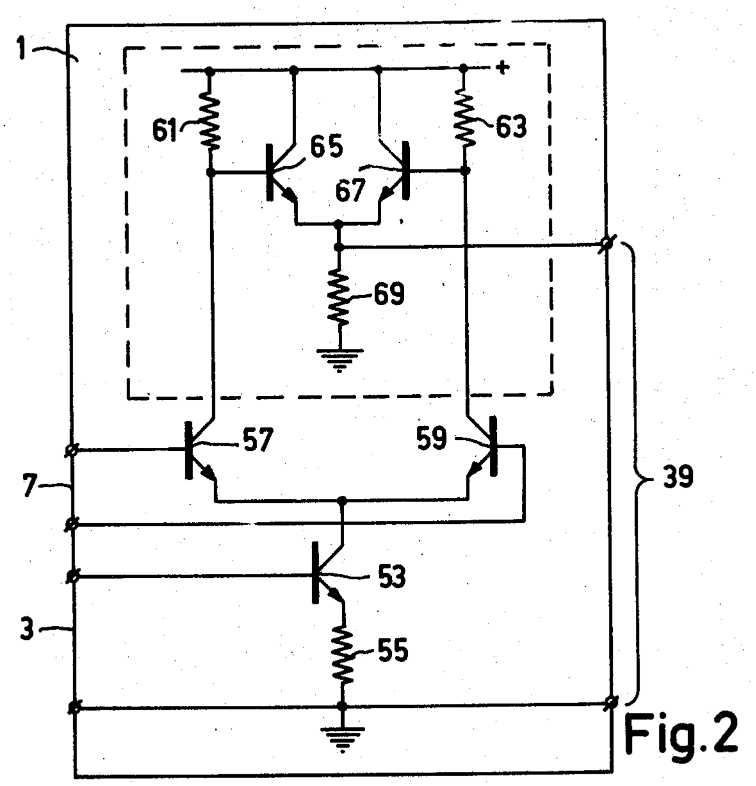
FIG. 2 shows a further embodiment of a demodulator circuit according to the invention employing transistors likewise in a non-detailed principle circuit diagram.

FIG. 2 shows a demodulator circuit 1 which is particularly suitable as an integrated circuit.

The first input 3 is connected at one end to the base of a first npn transistor 53 whose emitter is connected to earth through a resistor 55 likewise as the other end of the first input 3.

The second input 7 is connected between the bases of second and third npn transistors 57 and 59 whose emitters are connected to the collector of the first transistor 53.

The collector of the second transistor 57 is connected through a resistor 61 and that of the third transistor 59 is connected through a resistor 63 to a positive voltage supply. Resistors 69 and 63 together with parasitic capacitances constitute a balanced output circuit.

The collector of the second transistor 57 is connected to the base of a fourth npn transistor 65 and that of the third transistor 59 is connected to the base of a fifth npn transistor 67. The emitters of the fourth and fifth transistors 65, 67 are connected to earth through a resistor 69 and are furthermore connected to a terminal of the output 39 whose other terminal is connected to earth. The collectors of the fourth and fifth transistors 65, 67 are connected to the positive voltage supply (+). The fourth and fifth transistors constitute a full-wave rectifier circuit in the circuit arrangement shown.

The operation of the circuit arrangement is as follows:

A television signal to be demodulated and applied to the first input 3 drives the first transistor 53 substantially linearly. The second and third transistors 57, 59 are alternately rendered conducting and cut off and respectively are cut off and rendered conducting by the reference signal applied to input 7.

With respect to a level corresponding to the maximum modulation depth and being determined by the quiescent current adjustment of the first transistor, demodulated signals occur at the collectors of the second and third transistors 57, 59 in accordance with the waveforms 41 and 43 shown in FIG. 1 with the interference signals 45 and 47.

The fourth and fifth transistors 65, 67 each operate as an emitter follower when the bases is sufficiently positive relative to the emitter, but they are cut off when this is not the case. Thus a signal corresponding to the waveform 49 of FIG. 1 having a much less troublesome inverted interference 51 is produced at the output 39.

The first input 3 of the demodulator circuit may of course also be balanced with the addition of a transistor circuit whose connections may be established in known manner and corresponds to the transistor circuit 53, 57 and 59. As is known the circuit arrangement may be formed in a self balancing embodiment as regards the control by the input signals.

In the embodiments described, for example, the full-wave rectifier circuits may be mutually exchanged or other types of rectifier circuits may be used.

Furthermore, for example, amplifiers, emitter followers, level correctors and stabilising circuits may be provided in different positions which do not affect the essence of the present invention.

By using suitable chosen bias voltages, an inversion at a level other than that corresponding to 100 % modulation depth may be obtained, if desired.

Furthermore an inversion of the phase of the reference signal relative to that of the signal to be demodulated, as often occurs temporarily, does not have any harmful influence in the circuit arrangement according to the invention because the polarity of the output signal relative to the maximum modulation level is automatically corrected. Therefore fewer difficulties will occur in receivers equipped with such an arrangement when using an automatic gain control active on output signals of the demodulator circuit.

What is claimed is:

1. A circuit for demodulating a television signal modulated carrier using a reference signal having the same phase and frequency as said modulated carrier; said circuit comprising a first circuit means having a first input means for receiving said modulated carrier, a second input means for receiving said reference signal, and a balanced output means for supplying a pair of opposite polarity balanced demodulated television output signals; and means for preventing interference signals from exceeding a selected level of said demodulated signal comprising a full wave rectifier having a pair of inputs coupled to said balanced output means, and an output means for supplying an output signal comprising said demodulated television signal and at most a reduced amplitude interference signal.

2. A circuit as claimed in claim 1 wherein said full wave rectifier comprises a pair of transistors having emitters coupled to each other, opposite polarity driven bases coupled to said balanced output respectively, and collectors adapted to be coupled to a voltage supply, said rectifier output means being coupled to said emitters.

3. A circuit as claimed in claim 1 wherein said rectifier comprises a pair of diodes having a first set of like electrodes coupled to said balanced output means respectively, and a second pair of like electrodes coupled to said rectifier output means.

4. A circuit as claimed in claim 2 wherein said first circuit means comprises a first transistor having an emitter and base coupled to receive said modulated signal, and a collector; second and third transistors having emitters coupled to said first transistor collector, bases coupled to receive said reference signal, and collectors coupled to said bases of said transistor pair respectively.

* * * * *